US009341163B2

(12) United States Patent
Wakasa et al.

(10) Patent No.: US 9,341,163 B2
(45) Date of Patent: May 17, 2016

(54) WIND-TURBINE-GENERATOR CONTROL APPARATUS, WIND TURBINE GENERATOR SYSTEM, AND WIND-TURBINE-GENERATOR CONTROL METHOD

(75) Inventors: Tsuyoshi Wakasa, Tokyo (JP); Hisanobu Shinoda, Tokyo (JP); Masayuki Hashimoto, Tokyo (JP); Yukio Yamashita, Tokyo (JP); Takehiro Naka, Tokyo (JP); Akira Yasugi, Tokyo (JP); Takumi Nakashima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1006 days.

(21) Appl. No.: 13/454,666

(22) Filed: Apr. 24, 2012

(65) Prior Publication Data
US 2012/0205912 A1 Aug. 16, 2012

Related U.S. Application Data

(63) Continuation of application No. PCT/JP2011/080421, filed on Dec. 28, 2011.

(30) Foreign Application Priority Data

Dec. 28, 2010 (JP) .................................. 2010-294142

(51) Int. Cl.
*G05D 3/12* (2006.01)
*F03D 9/00* (2016.01)

(52) U.S. Cl.
CPC .......... *F03D 9/003* (2013.01); *F05B 2270/1041* (2013.01); *F05B 2270/335* (2013.01); *F05B 2270/337* (2013.01); *Y02E 10/72* (2013.01)

(58) Field of Classification Search
CPC ....... F03D 7/026; F03D 7/028; F03D 7/0284; F03D 9/003; F05B 2270/1041; F05B 2270/335; F05B 2270/337; Y02E 10/72
USPC ......................................................... 700/290
See application file for complete search history.

(56) References Cited

U.S. PATENT DOCUMENTS 7,345,373 B2   3/2008  Delmerico et al.
8,573,937 B2 * 11/2013  Preus .............................. 416/51
(Continued)

FOREIGN PATENT DOCUMENTS

CA      2722848 A1   4/2010
CN      1639462 A    7/2005
(Continued)

OTHER PUBLICATIONS

International Search Report for PCT/JP2011/080421, dated Apr. 17, 2012.
(Continued)

*Primary Examiner* — Robert Fennema
*Assistant Examiner* — Sivalingam Sivanesan
(74) *Attorney, Agent, or Firm* — Kanesaka Berner and Partners LLP

(57) ABSTRACT

A wind-turbine control device controls a wind turbine generator in which a rotor having a plurality of blades receives wind and rotates. The generator generates electrical power through the rotation of the rotor. The electrical power is supplied to a utility grid, and electric energy to be supplied to the utility grid can be changed according to a change in the frequency of the utility grid. The wind-turbine control device includes a subtracter to calculate a frequency change, which is the difference between a measurement value of the frequency of generated output power of the wind turbine generator and a set value of the frequency of the generated output power of the wind turbine generator. The wind-turbine control device further includes a limiter to limit a change in the electrical power corresponding to the frequency change calculated by the subtracter, based on the rotational speed of the generator.

11 Claims, 12 Drawing Sheets

(56) References Cited

U.S. PATENT DOCUMENTS

| | | | |
|---|---|---|---|
| 8,610,298 B2* | 12/2013 | Acedo Sanchez | F03D 7/0224 290/44 |
| 2006/0249957 A1* | 11/2006 | Ito et al. | 290/44 |
| 2007/0047163 A1* | 3/2007 | Lutze et al. | 361/78 |
| 2007/0120369 A1* | 5/2007 | Delmerico et al. | 290/44 |
| 2009/0066089 A1* | 3/2009 | Arinaga et al. | 290/55 |
| 2011/0031748 A1 | 2/2011 | Arinaga et al. | |
| 2011/0057445 A1* | 3/2011 | Acedo Sanchez | F03D 7/0224 290/44 |
| 2011/0140423 A1* | 6/2011 | Menke | 290/44 |
| 2013/0140820 A1* | 6/2013 | Tarnowski | F03D 7/0284 290/44 |

FOREIGN PATENT DOCUMENTS

| | | | |
|---|---|---|---|
| CN | 1711675 A | 12/2005 | |
| CN | 1894837 A | 1/2007 | |
| CN | 1976210 A | 6/2007 | |
| CN | 101042111 A | 9/2007 | |
| CN | 101395369 A | 3/2009 | |
| DE | 102009037238 B3 | 12/2010 | |
| EP | 2209206 A1 | 7/2010 | |
| JP | 2004015854 A | 1/2004 | |
| JP | 2005073418 A | 3/2005 | |
| JP | 2007231778 A | 9/2007 | |
| JP | 2012516667 A | 7/2012 | |
| WO | 2004047284 A1 | 6/2004 | |
| WO | 2010/000663 A1 | 1/2010 | |
| WO | 2010086032 A2 | 8/2010 | |
| WO | WO 2010086032 A2 * | 8/2010 | H02P 9/04 |

OTHER PUBLICATIONS

Decision to Grant a Patent issued Dec. 10, 2013, corresponds Japanese patent application No. 2010-294142.

Office Action mailed Nov. 26, 2014, corresponding to Chinese patent application No. 201180034622.0.

Extended European Search Report dated Oct. 23, 2015, corresponding to European Patent Application No. 11853529.3.

Decision to Grant a Patent dated Aug. 11, 2015, corresponding to Chinese Patent Application No. 201180034622.0.

* cited by examiner

US 9,341,163 B2

WIND-TURBINE-GENERATOR CONTROL APPARATUS, WIND TURBINE GENERATOR SYSTEM, AND WIND-TURBINE-GENERATOR CONTROL METHOD

CROSS REFERENCE TO RELATED APPLICATIONS

This application is a continuation application of PCT/JP2011/080421 filed on Dec. 28, 2011 and claims the benefit of Japanese Application No. 2010-294142 filed in Japan on Dec. 28, 2010, the contents of which is hereby incorporated by its reference.

TECHNICAL FIELD

The present invention relates to a wind-turbine-generator control apparatus, a wind turbine generator system, and a wind-turbine-generator control method.

BACKGROUND ART

In recent years, grid-connected wind turbine generators have been required to contribute to recovery from a change in the frequency of the utility grid (primary frequency response, hereinafter, referred to as "PFR") within a predetermined time range (for example, within 30 seconds) from the occurrence of a disturbance in the utility grid.

U.S. Pat. No. 7,345,373 describes that, in PFR, a limit is provided for active electrical power to be output, based on the rotational speed of the rotor or generated output power.

SUMMARY OF INVENTION

Technical Problem

In general, to carry out PFR, the output power to be generated by a wind turbine generator is increased or decreased according to the diviation (frequency change) between a set frequency and the actual frequency (measurement value). However, in a wind turbine generator, which uses unstable natural energy as the power source, the rotational speed of the rotor may be significantly changed, in some cases, compared with a turbine generator (synchronous generator) that uses controllable stable energy, such as combustion of gas and steam, as the power source.

Thus, as shown in FIG. 10, if a PFR demand level, which is the generated output power additionally demanded to carry out PFR, is too large, when the rotational speed of the rotor is low, for example, and even the inertial force of the rotor is used for power generation, the rotational speed of the rotor may become lower than a disconnection lower limit, thus causing disconnection of the wind turbine generator. Furthermore, for example, when the rotational speed of the rotor is high, if a further increase in the amount of generated power is demanded, the rotational speed of the rotor may exceed an overspeed upper limit, thus causing tripping of the wind turbine generator (output power cutoff), in some cases. Note that tripping may also be caused by overpower or overcurrent, in addition to overspeed of the rotor.

Such disconnection or tripping of the wind turbine generator while PFR is being carried out may, in some cases, act as a disturbance on the utility grid and make the frequency of the utility grid less stable compared with when PFR is not carried out. Furthermore, it takes time to restart the wind turbine generator once the wind turbine generator has tripped; therefore, the wind turbine generator cannot achieve the aim of recovering the frequency of the utility grid.

The present invention has been made in view of such circumstances, and an object thereof is to provide a wind-turbine-generator control apparatus, a wind turbine generator system, and a wind-turbine-generator control method in which it is possible to prevent a situation in which, when a change in the frequency of the utility grid is to be recovered from, an increase or decrease in the generated output power becomes excessive, thus making the wind turbine generator unable to supply electrical power to the utility grid.

Solution to Problem

In order to solve the above-described problems, the wind-turbine-generator control apparatus, the wind turbine generator system, and the wind-turbine-generator control method of the present invention employ the following solutions.

According to a first aspect, the present invention provides a wind-turbine-generator control apparatus for a wind-turbine generator in which a rotor having a plurality of blades receives wind and rotates, a generator generates electrical power through the rotation of the rotor, the electrical power is supplied to a utility grid, and electric energy to be supplied to the utility grid can be changed according to a change in the frequency of the utility grid, the wind-turbine-generator control apparatus including: calculation means for calculating a frequency change, which is the difference between a measurement value of the frequency of generated output power of the wind turbine generator and a set value of the frequency of the generated output power of the wind turbine generator; and limiting means for limiting a change in the electrical power corresponding to the frequency change calculated by the calculation means, based on the rotational speed of the generator.

The wind-turbine-generator control apparatus according to the first aspect controls the wind turbine generator, in which the rotor having the plurality of blades receive wind and rotates, the generator generates electrical power through the rotation of the rotor, the electrical power is supplied to the utility grid, and electric energy to be supplied to the utility grid can be changed according to a change in the frequency of the utility grid.

In the wind-turbine-generator control apparatus according to the first aspect, the calculation means calculates the frequency change, which is the difference between the measurement value of the frequency of the generated output power of the wind turbine generator and the set value of the frequency of the generated output power of the wind turbine generator. The frequency change is the difference between a demand frequency of the generated output power of the wind turbine generator and the actual frequency of the generated output power. When a change in the frequency occurs in the utility grid, a set value for recovering from the change is input to the control means. Specifically, when a change in the frequency occurs in the utility grid, the calculation means calculates the frequency change that is needed to recover from the change in the frequency of the utility grid.

The limiting means limits the change in the electrical power corresponding to the frequency change calculated by the calculation means, based on the rotational speed of the generator.

There is a one-to-one relationship between the frequency of the generated output power of the wind turbine generator and the electrical power (active electrical power). Changing the frequency will change the electrical power. However, if more electrical power is output from the wind turbine generator according to the frequency change, the rotation of the rotor may become equal to or lower than a rotational speed at which the wind turbine generator is disconnected from the utility grid. Furthermore, the rotation of the rotor may exceed an overspeed upper limit, and the wind turbine generator may trip, in some cases. The disconnection or tripping of the wind turbine generator not only makes no contribution to the recovery from the change in the frequency of the utility grid but also makes the frequency of the utility grid less stable. Furthermore, the rotational speed of the generator has a relationship with the rotational speed of the rotor. When the rotational speed of the generator is low, the rotational speed of the rotor is also low, and, when the rotational speed of the generator is high, the rotational speed of the rotor is also high.

Thus, the wind-turbine-generator control apparatus according to the first aspect limits the change in the electrical power corresponding to the frequency change, based on the rotational speed of the generator, thereby making it possible to prevent a situation in which, when a change in the frequency of the utility grid is to be recovered from, an increase or decrease in the generated output power becomes excessive, thus making the wind turbine generator unable to supply electrical power to the utility grid.

Furthermore, the wind-turbine-generator control apparatus according to the first aspect may have a configuration in which the limiting means sets the change in the electrical power to a preset first limit value when the rotational speed of the generator is equal to or lower than a first set value; sets the change in the electrical power to a preset second limit value that is higher than the first limit value when the rotational speed of the generator is equal to or higher than a second set value; and increases a limit value for the change in the electrical power within a range from the first limit value to the second limit value, as the rotational speed of the generator is increased, when the rotational speed of the generator exceeds the first set value and is lower than the second set value.

According to this configuration, the limiting means sets the change in the electrical power to the first limit value when the rotational speed of the generator is equal to or lower than the first set value, and sets the change in the electrical power to the preset second limit value that is higher than the first limit value when the rotational speed of the generator is equal to or higher than the second set value. Furthermore, when the rotational speed of the generator exceeds the first set value and is lower than the second set value, the limiting means increases the limit value for the change in the electrical power within the range from the first limit value to the second limit value, as the rotational speed of the generator is increased.

For example, when the rotational speed of the generator is equal to or lower than the first set value, the rotational speed of the rotor is lower, and, if more electrical power than in the current state is to be output, the rotational speed of the rotor may become too low, and the generated output power of the wind turbine generator may become lower than the disconnection lower limit. In this case, the first limit value is provided for the change in the electrical power to prevent the wind turbine generator from being disconnected.

On the other hand, when the rotational speed of the generator is equal to or higher than the second set value, the rotational speed of the rotor is higher, and, if more electrical power than in the current state is to be output, the wind turbine generator may trip. In this case, the second limit value is provided for the change in the electrical power to prevent the wind turbine generator from tripping.

When the rotational speed of the generator exceeds the first set value and is lower than the second set value, the limit value for the change in the electrical power is increased as the rotational speed of the generator is increased, thus limiting the change in the electrical power to the limit value corresponding to the rotational speed of the generator.

Therefore, the wind-turbine-generator control apparatus having the above-described configuration can more reliably prevent a situation in which, when a change in the frequency of the utility grid is to be recovered from, an increase or decrease in the generated output power becomes excessive, thus making the wind turbine generator unable to supply electrical power to the utility grid.

The wind-turbine-generator control apparatus according to the first aspect may have a configuration in which: the limiting means multiplies the change in the electrical power by a given gain; and the given gain is set to a first gain when the rotational speed of the generator is equal to or lower than a first set value; is set to a second gain when the rotational speed of the generator is equal to or higher than a second set value; is increased to a third gain that is higher than the first gain and the second gain, as the rotational speed of the generator is increased, when the rotational speed of the generator exceeds the first set value; and, after reaching the third gain, is reduced to the second gain until the rotational speed of the generator reaches the second set value.

According to this configuration, the gain by which the change in the electrical power is multiplied by the limiting means is set to the first gain when the rotational speed of the generator is equal to or lower than the first set value and is set to the second gain when the rotational speed of the generator is equal to or higher than the second set value. Specifically, the change in the electrical power is decreased by setting the first gain and the second gain small (for example, 0 (zero)). Thus, it is possible to prevent the rotational speed of the rotor from becoming too low and the generated output power from becoming too high.

When the rotational speed of the generator falls within the range from the first set value to the second set value, the gain is set so as to be increased to the third gain, which is higher than the first gain and the second gain, as the rotational speed of the generator is increased, and the gain is set so as to be reduced to the second gain after reaching the third gain.

Therefore, the wind-turbine-generator control apparatus having the above-described configuration can more reliably prevent a situation in which, when a change in the frequency of the utility grid is to be recovered from, an increase or decrease in the generated output power becomes excessive, thus making the wind turbine generator unable to supply electrical power to the utility grid.

The wind-turbine-generator control apparatus according to the first aspect may have a configuration in which the limiting means corrects the change in the electrical power based on the acceleration of the rotation of the generator.

According to this configuration, the change in the electrical power is corrected, for example, based on the acceleration of rotation of the generator calculated from the differential value of the rotational speed of the generator. Specifically, the change in the electrical power is corrected according to the deceleration and acceleration of the rotational speed.

Therefore, the wind-turbine-generator control apparatus having the above-described configuration can more reliably prevent a situation in which, when a change in the frequency of the utility grid is to be recovered from, an increase or decrease in the generated output power becomes excessive, thus making the wind turbine generator unable to supply electrical power to the utility grid.

The wind-turbine-generator control apparatus according to the first aspect may have a configuration in which the limiting means predicts the frequency of the generated output power of the wind turbine generator and a change in wind speed with respect to the wind turbine generator based on the rotational speed of the generator, the measurement value of the frequency, and the wind speed with respect to the wind turbine generator, and corrects the change in the electrical power based on the prediction results.

According to this configuration, the frequency of the generated output power of the wind turbine generator and the change in wind speed are predicted, and the change in the electrical power is corrected based on the prediction results; therefore, it is possible to more reliably prevent a situation in which, when a change in the frequency of the utility grid is to be recovered from, an increase or decrease in the generated output power becomes excessive, thus making the wind turbine generator unable to supply electrical power to the utility grid.

According to a second aspect, the present invention provides a wind turbine generator system including: a wind turbine generator in which a rotor having a plurality of blades receives wind and rotates, a generator generates electrical power through the rotation of the rotor, the electrical power is supplied to a utility grid, and electric energy to be supplied to the utility grid can be changed according to a change in the frequency of the utility grid; and a wind-turbine-generator control apparatus that controls the wind turbine generator, according to the first aspect.

According to the wind turbine generator system of the second aspect, since the wind turbine generator is controlled by the above-described control apparatus, it is possible to prevent a situation in which, when a change in the frequency of the utility grid is to be recovered from, an increase or decrease in the generated output power becomes excessive, thus making the wind turbine generator unable to supply electrical power to the utility grid.

According to a third aspect, the present invention provides a wind-turbine-generator control method for a wind-turbine-generator in which a rotor having a plurality of blades receives wind and rotates, a generator generates electrical power through the rotation of the rotor, the electrical power is supplied to a utility grid, and electric energy to be supplied to the utility grid can be changed according to a change in the frequency of the utility grid, the method including: a first step of calculating a frequency change, which is the difference between a measurement value of the frequency of generated output power of the wind turbine generator and a set value of the frequency of the generated output power of the wind turbine generator; and a second step of limiting a change in the electrical power corresponding to the frequency change calculated in the first step, based on the rotational speed of the generator.

According to the wind-turbine-generator control method of the third aspect, the change in the electrical power corresponding to the frequency change is limited based on the rotational speed of the generator; therefore, it is possible to prevent a situation in which, when a change in the frequency of the utility grid is to be recovered from, an increase or decrease in the generated output power becomes excessive, thus making the wind turbine generator unable to supply electrical power to the utility grid.

Advantageous Effects of Invention

According to the present invention, an advantage is afforded in that it is possible to prevent a situation in which, when a change in the frequency of the utility grid is to be recovered from, an increase or decrease in the generated output power becomes excessive, thus making the wind turbine generator unable to supply electrical power to the utility grid.

DESCRIPTION OF EMBODIMENTS

A wind-turbine-generator control apparatus, a wind turbine generator system, and a wind-turbine-generator control method according to the present invention will be described below with reference to the drawings.

First Embodiment

A first embodiment of the present invention will be described below.

Figure 1:
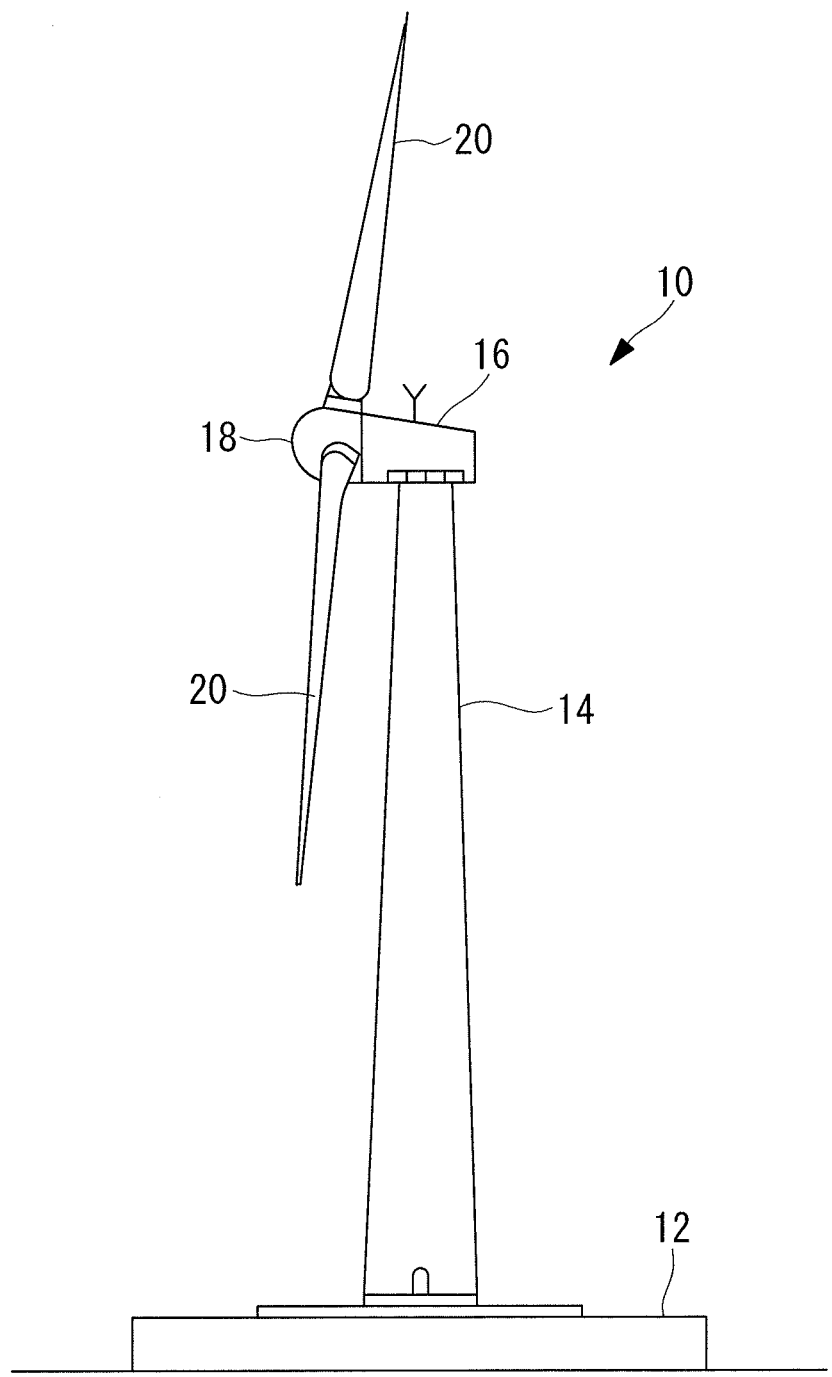
FIG. 1 is an outline view of a wind turbine generator according to a first embodiment of the present invention.

FIG. 1 is an outline view of a wind turbine generator 10 according to the first embodiment.

The wind turbine generator 10 shown in FIG. 1 is a so-called variable-speed wind turbine and includes a tower 14 provided upright on a foundation 12, a nacelle 16 provided on the top of the tower 14, and a rotor 18 provided on the nacelle 16 so as to be capable of rotating about a substantially horizontal axis.

A plurality of (for example, three in the first embodiment) wind-turbine rotor blades (hereinafter, simply referred to as "blades 20") are attached to the rotor 18 in a radiating pattern from the rotational axis of the rotor 18. With this structure, the force of wind striking the blades 20 from the direction of the rotational axis of the rotor 18 is converted to mechanical power causing the rotor 18 to rotate about the rotational axis, and the mechanical power is converted to electrical power by a generator 46 (see FIG. 2), which is a synchronous generator. Note that the blades 20 are coupled to the rotor 18 so as to be capable of rotating according to the operating conditions, and the pitch angles of the blades 20 can be changed.

Figure 2:
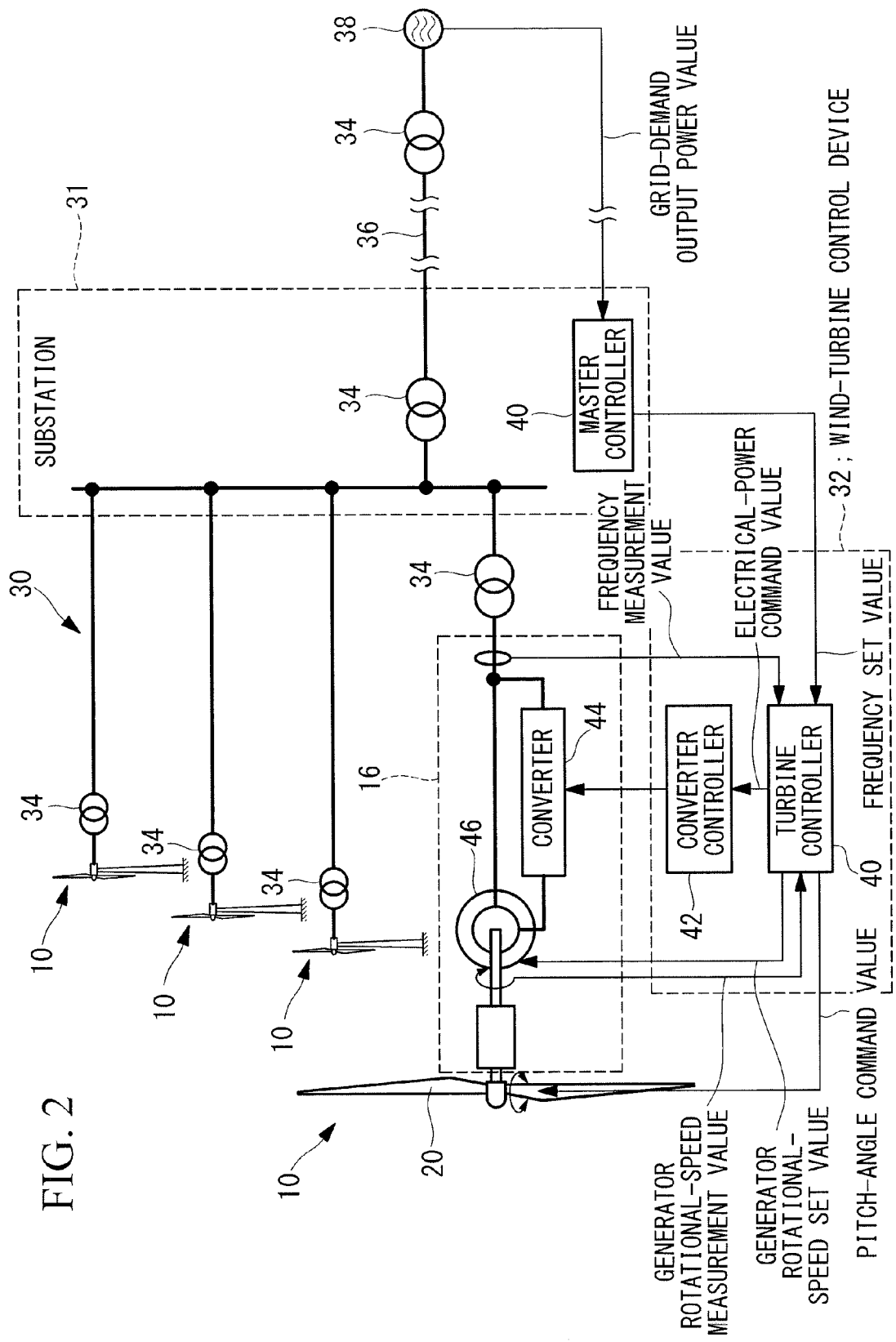
FIG. 2 is a schematic diagram showing the overall configuration of a wind farm and the electrical configuration of the wind turbine generator according to the first embodiment of the present invention.

FIG. 2 is a schematic diagram showing the overall configuration of a wind farm 30 and the electrical configuration of the wind turbine generator 10, according to the first embodiment. The wind farm 30 includes a plurality of the wind turbine generators 10, a substation 31, and a plurality of wind-turbine control devices 32 that are respectively provided for the wind turbine generators 10. Note that a combination of each of the wind turbine generators 10 and each of the wind-turbine control devices 32 is called a wind turbine generator system.

The wind turbine generators 10 are connected to the substation 31 via transformers 34 and are grid-connected via a transformer 34 of the substation 31 and a transmission line 36, thus supplying electrical power to the utility grid 38.

Furthermore, the substation 31 includes a master controller 41 (for example, SCADA (supervisory control and data acquisition)) that controls the entire wind farm 30.

The master controller 41 receives a grid-demand output power value indicating an output power value (electric energy) demanded by the utility grid 38 and sends it to the wind-turbine control devices 32.

Each of the wind-turbine control devices 32 generates an electrical-power command value according to the grid-demand output power value in order to control the corresponding wind turbine generator 10 and controls the generated output power (active electrical power) of the corresponding wind turbine generator 10, and also generates a pitch-angle command value in order to control the pitch angles of the blades 20 and outputs it to a pitch actuator (not shown). Furthermore, the wind-turbine control device 32 sends data indicating the generated output power of the wind turbine generator 10 and the control state of the wind turbine generator 10 to the master controller 41.

Note that the wind-turbine control device 32 includes a turbine controller 40 and a converter controller 42.

The turbine controller 40 stores, as a parameter according to the grid-demand output power value, a set frequency value (hereinafter, referred to as "frequency set value") of the generated output power of the wind turbine generator 10, generates an electrical-power command value based on the frequency set value, and outputs it to the converter controller 42.

Then, the converter controller 42 controls a converter 44 provided in the wind turbine generator 10, based on the received electrical-power command value.

The converter 44 controls the generated output power to be supplied from the generator 46 to the utility grid 38, based on a control signal received from the converter controller 42.

Next, generation of the electrical-power command value performed by the turbine controller 40 will be described.

Figure 3:
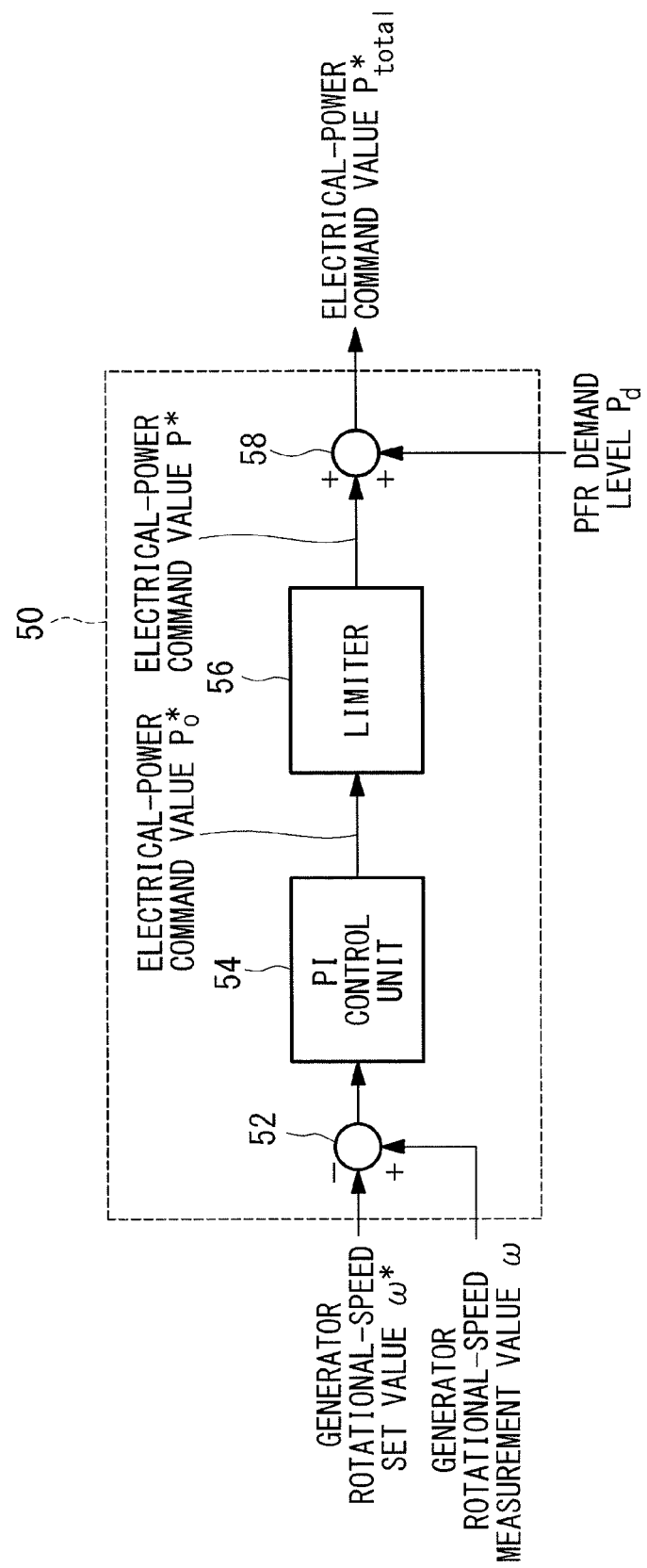
FIG. 3 is a block diagram showing the configuration of an electrical-power-command-value generating section according to the first embodiment of the present invention.

FIG. 3 is a block diagram showing the configuration of an electrical-power-command-value generating section 50 that generates the electrical-power command value.

The electrical-power-command-value generating section 50 receives a generator rotational-speed set value $\omega^*$ and a generator rotational-speed measurement value $\omega$. The generator rotational-speed set value $\omega^*$ is generated based on the frequency set value, and the generator rotational-speed measurement value $\omega$ is the actually-measured rotational speed of the generator 46.

The generator rotational-speed set value $\omega^*$ and the generator rotational-speed measurement value $\omega$ are input to a subtracter 52, and the subtracter 52 outputs the deviation between the generator rotational-speed set value $\omega^*$ and the generator rotational-speed measurement value $\omega$ to a PI control unit 54.

The PI control unit 54 generates an electrical-power command value $P^*_o$ based on the received deviation and outputs it to a limiter 56.

When the input electrical-power command value $P^*_o$ exceeds a predetermined upper limit, the limiter 56 limits the electrical-power command value $P^*_o$ to this upper limit and outputs an electrical-power command value $P^*$. An adder 58 adds the electrical-power command value output from the limiter 56 to a PFR demand level $P_d$ and outputs an electrical-power command value $P^*_{total}$ to the converter controller 42. Note that the PFR demand level $P_d$ is output from a PFR-demand-level generating section 60, to be described later, provided in the turbine controller 40.

The generated output power of the wind turbine generator 10 can be changed through the control carried out by the wind-turbine control device 32, according to a change in the frequency of the utility grid 38 (hereinafter, referred to as "grid frequency"). Specifically, when a change in the grid frequency occurs, the wind turbine generator 10 carries out PFR to recover from the change. The PFR demand level $P_d$ is the amount of increase or decrease in the generated output power, used to carry out PFR.

However, if the PFR demand level $P_d$ is too large, when the rotational speed of the rotor 18 is low, for example, and even the inertial force of the rotor 18 is used for power generation, the rotational speed of the rotor 18 may become lower than a disconnection lower limit, thus causing disconnection of the wind turbine generator 10. Furthermore, when the rotational speed of the rotor 18 is high, if a further increase in the amount of generated power is demanded, the rotational speed of the rotor 18 may exceed an overspeed upper limit, thus causing tripping of the wind turbine generator 10, in some cases. The disconnection or tripping of the wind turbine generator 10 not only makes no contribution to the recovery from the change in the frequency of the utility grid 38 but also makes the frequency of the utility grid 38 less stable.

Therefore, the wind-turbine control device 32 of the first embodiment generates a PFR demand level $P_d$ that is limited so as not to become excessive.

Figure 4:
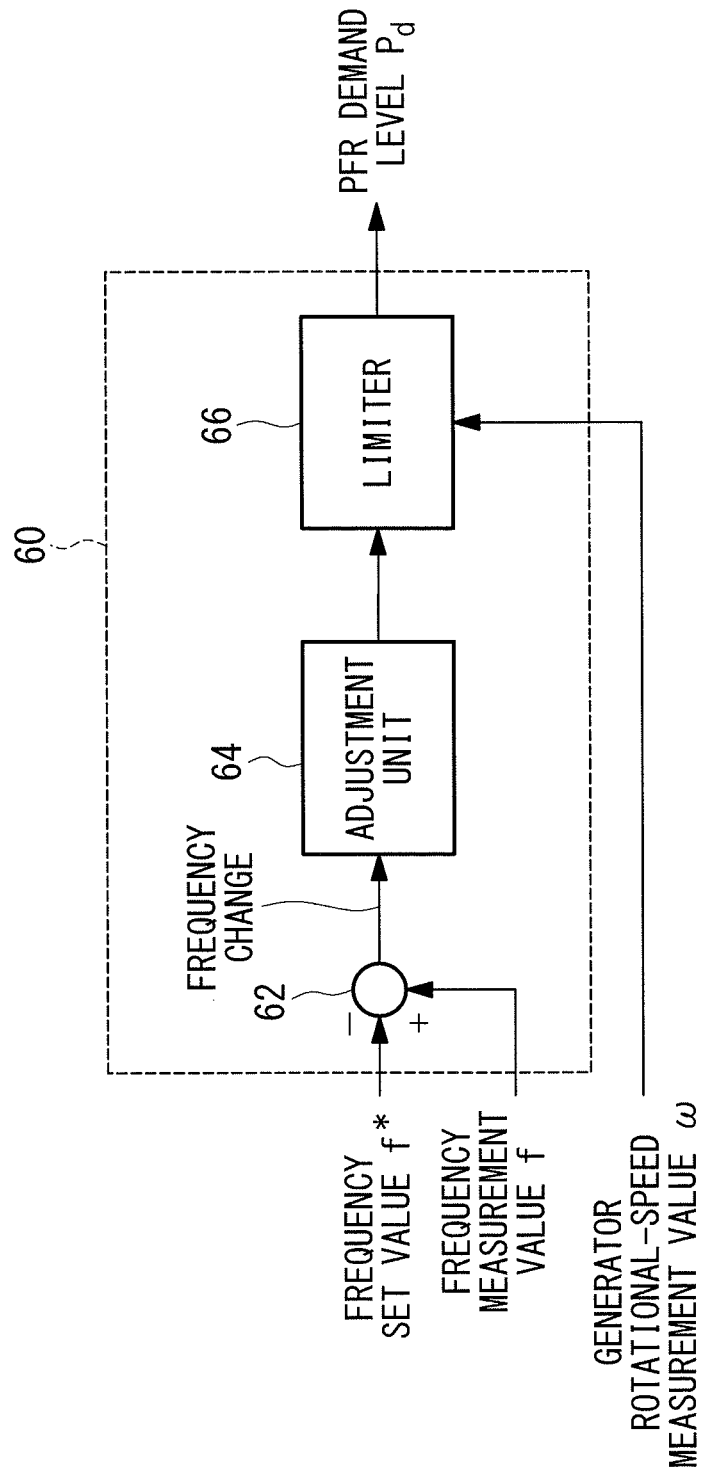
FIG. 4 is a block diagram showing the configuration of a PFR-demand-level generating section according to the first embodiment of the present invention.

FIG. 4 is a block diagram showing the configuration of the PFR-demand-level generating section 60 of the first embodiment.

The PFR-demand-level generating section 60 includes a subtracter 62, an adjustment unit 64, and a limiter 66.

The subtracter 62 receives a measurement value of the frequency (hereinafter, referred to as "frequency measurement value") f of the generated output power of the wind turbine generator 10 and a frequency set value f* of the wind turbine generator 10 and calculates the frequency change that is the difference between the frequency measurement value f and the frequency set value f*.

The frequency change is the difference between the demand frequency (frequency set value f*) of the generated output power of the wind turbine generator 10 and the actual frequency (frequency measurement value f) of the generated output power. When a change in the frequency occurs in the utility grid 38, the frequency set value f* for recovering from the change is input to the PFR-demand-level generating section 60. Specifically, when a change in the frequency occurs in the utility grid 38, the subtracter 62 calculates the frequency change that is needed to recover from the change in the frequency of the utility grid 38.

The adjustment unit 64 multiplies the frequency change by a predetermined adjustment rate (1/R (one R-th), wherein R is a constant), thus calculating the amount of change in the electrical power corresponding to the frequency change.

Then, the limiter 66 receives the measurement value ω of the rotational speed of the generator 46 (hereinafter, referred to as "generator rotational-speed measurement value") and outputs a PFR demand level $P_d$ that is obtained after limiting the received amount of change in the electrical power based on the generator rotational-speed measurement value ω, to the electrical-power-command-value generating section 50.

Note that, as described above, the adjustment unit 64 multiplies the frequency change by the adjustment rate to calculate the electrical power corresponding to the frequency; thus, there is a one-to-one relationship between the frequency of the generated output power of the wind turbine generator 10 and the electrical power (active electrical power). Changing the frequency will change the electrical power.

Furthermore, the rotational speed of the generator 46 has a relationship with the rotational speed of the rotor 18. When the rotational speed of the generator 46 is low, the rotational speed of the rotor 18 is also low, and, when the rotational speed of the generator 46 is high, the rotational speed of the rotor 18 is also high.

In this way, the wind-turbine control device 32 of the first embodiment limits the amount of change in the electrical power corresponding to the frequency change, based on the generator rotational-speed measurement value ω, which is associated with the rotational speed of the rotor 18. Therefore, it is possible to prevent a situation in which, when a change in the frequency of the utility grid 38 is to be recovered from, an increase or decrease in the generated output power becomes excessive, thus making the wind turbine generator 10 unable to supply electrical power to the utility grid 38.

Note that the limiter 66 of the first embodiment outputs the PFR demand level $P_d$, which is obtained by limiting the received amount of change in the electrical power based on the relationship between the generator rotational speed ω, shown in FIG. 4, and the PFR-demand-level limit values.

The limiter 66 of the first embodiment sets the amount of change in the electrical power to a first limit value when the generator rotational-speed measurement value ω is equal to or lower than the minimum set value and sets the amount of change in the electrical power to a preset second limit value that is higher than the first limit value when the generator rotational-speed measurement value ω is equal to or higher than the maximum set value. Furthermore, when the generator rotational-speed measurement value ω exceeds the minimum set value and is lower than the maximum set value, the limiter 66 increases the limit value for the amount of change in the electrical power within a range from the first limit value to the second limit value, as the generator rotational-speed measurement value ω is increased.

Figure 5:
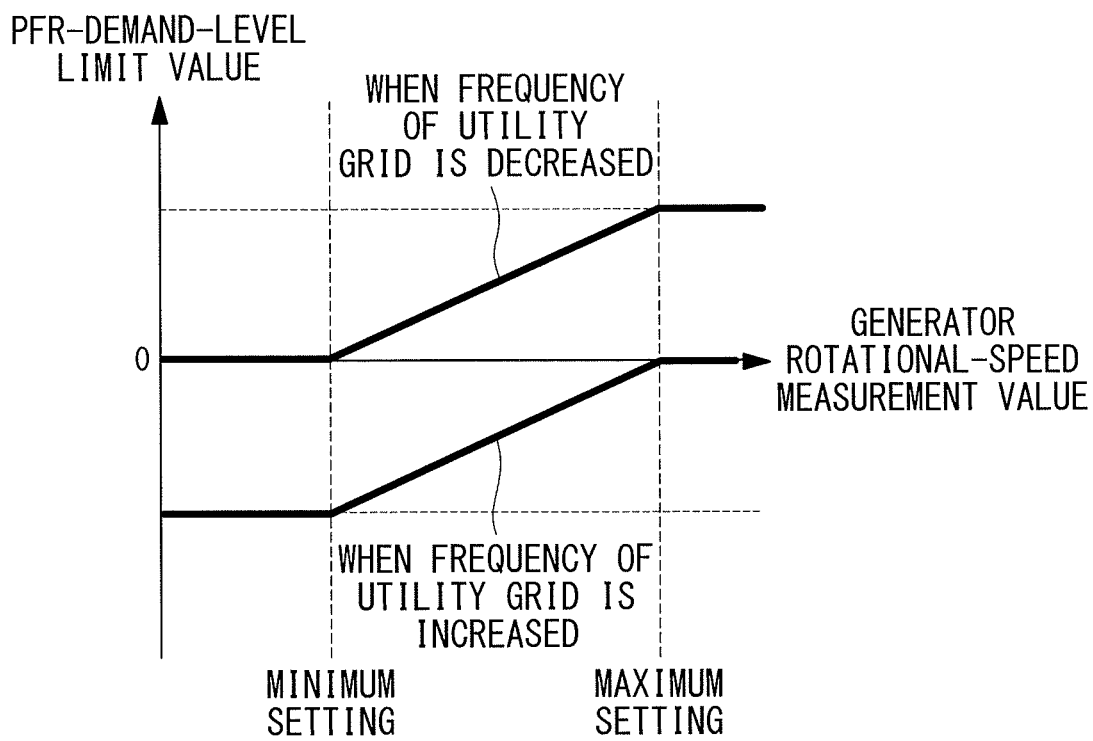
FIG. 5 is a schematic diagram showing example PFR-demand-level limit values according to the first embodiment of the present invention.

For example, as shown in FIG. 5, in a case where the frequency of the utility grid 38 is reduced (the frequency set value f* is higher than the frequency measurement value f), when the generator rotational-speed measurement value ω is equal to or lower than the minimum set value, the rotational speed of the rotor 18 is lower, and, if the inertial force of the rotor 18 is used in order to output more electrical power than in the current state, the rotational speed of the rotor 18 becomes too low thereafter, and the generated output power of the wind turbine generator 10 may become lower than the disconnection lower limit. In this case, the first limit value (0 (zero) in the example shown in FIG. 5) is provided for the amount of change in the electrical power to prevent the wind turbine generator 10 from being disconnected. Specifically, since the PFR demand level $P_d$ for the wind turbine generator 10 whose generator rotational-speed measurement value ω is equal to or lower than the minimum set value becomes 0, this wind turbine generator 10 does not carry out PFR.

On the other hand, in the case where the frequency of the utility grid 38 is reduced, when the generator rotational-speed measurement value ω is equal to or higher than the maximum set value, the rotational speed of the rotor 18 is higher, and the wind turbine generator 10 may trip if more electrical power than in the current state is to be output. In this case, the second limit value is provided for the amount of change in the electrical power to prevent the wind turbine generator 10 from tripping.

When the generator rotational-speed measurement value ω exceeds the minimum set value and is lower than the maximum set value, the limit value for the amount of change in the electrical power is increased as the rotational speed of the generator 46 is increased, thus limiting the amount of change in the electrical power to the limit value corresponding to the rotational speed of the generator 46, and the amount of change in the electrical power is output as the PFR demand level $P_d$.

In this way, in the case where the frequency of the utility grid 38 is reduced, since the PFR demand level $P_d$ is changed within the range from 0 to a positive value, the wind turbine generator 10 supplies more electrical power to the utility grid 38. Specifically, the wind-turbine control device 32 performs control in which the pitch angles of the blades 20 are changed even farther to the fine side to increase the rotational speed of the rotor 18, thus increasing the generated output power, control in which the generated output power is increased by using the inertial force stored in the rotor 18, and other control.

On the other hand, as shown in FIG. 5, in a case where the frequency of the utility grid 38 is increased (the frequency set value f* is lower than the frequency measurement value f), the first limit value corresponding to the minimum set value is 0 or lower, and the second limit value corresponding to the maximum set value is 0.

Therefore, in the case where the frequency of the utility grid 38 is increased, since the PFR demand level $P_d$ is changed within the range from a negative value to 0, the wind turbine generator 10 reduces the electrical power to be supplied to the utility grid 38. Specifically, the wind-turbine control device 32 performs control in which the pitch angles of the blades 20 are changed even farther to the feather side to reduce the rotational speed of the rotor 18, thus reducing the generated output power, and other control.

Therefore, the wind-turbine control device 32 of the first embodiment can more reliably prevent a situation in which, when a change in the frequency of the utility grid 38 is to be recovered from, an increase or decrease in the generated output power becomes excessive, thus making the wind turbine generator 10 unable to supply electrical power to the utility grid.

Note that the PFR-demand-level limit values shown in FIG. 5 are just examples and the invention is not limited thereto.

Second Embodiment

A second embodiment of the present invention will be described below.

Note that the configurations of the wind turbine generator 10, the wind farm 30, and the electrical-power-command-value generating section 50 of the second embodiment are the same as those of the wind turbine generator 10, the wind farm 30, and the electrical-power-command-value generating section 50 of the first embodiment, shown in FIGS. 1, 2, and 3; therefore, a description thereof will be omitted.

Figure 6:
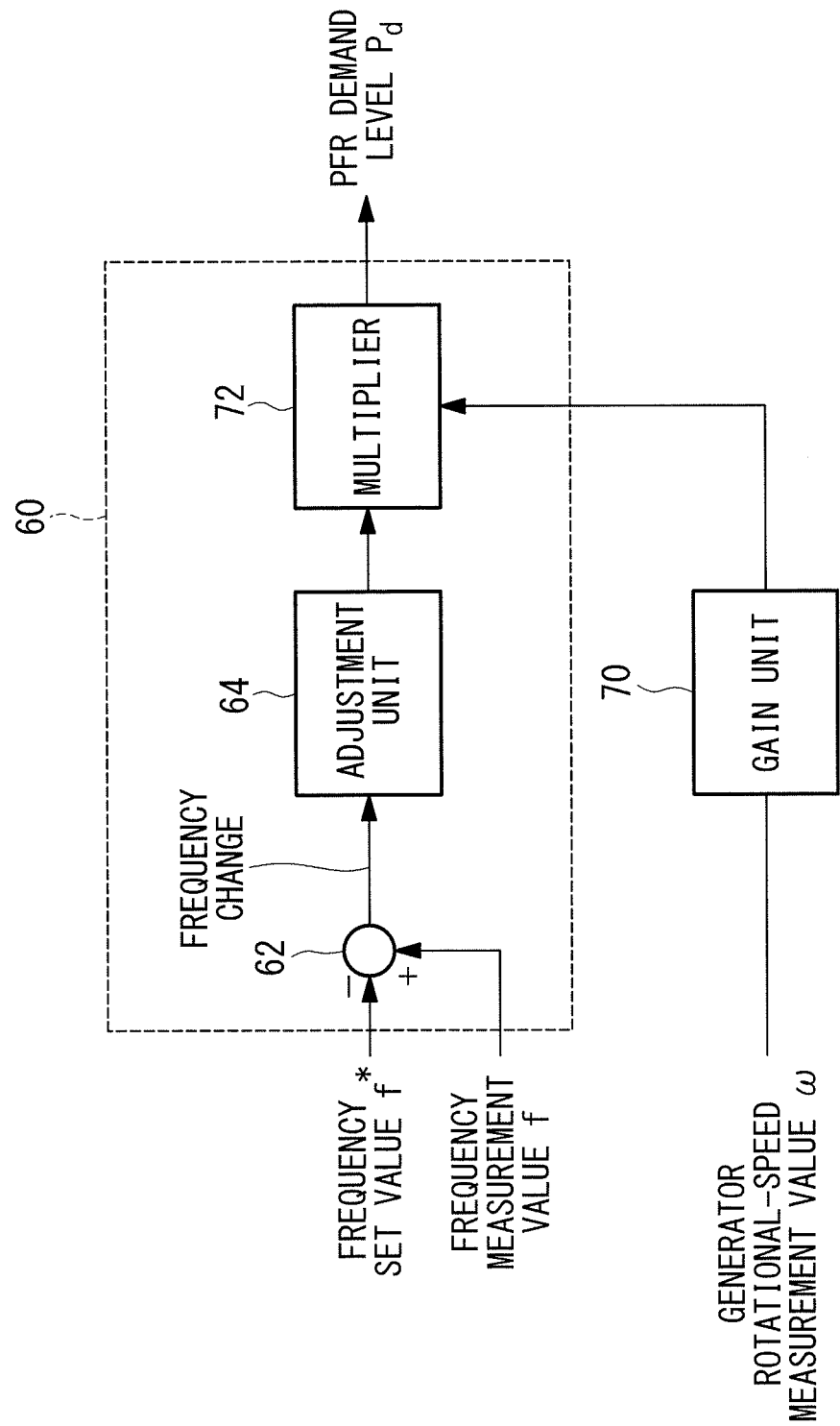
FIG. 6 is a block diagram showing the configuration of a PFR-demand-level generating section according to a second embodiment of the present invention.

FIG. 6 shows the configuration of the PFR-demand-level generating section 60 of the second embodiment. Note that the same reference symbols as those in FIG. 4 are assigned to the same constituent parts shown in FIG. 6 as those shown in FIG. 4, and a description thereof will be omitted.

The PFR-demand-level generating section 60 of the second embodiment includes a gain unit 70 and a multiplier 72.

The gain unit 70 receives the generator rotational-speed measurement value $\omega$ and outputs a gain obtained based on the generator rotational-speed measurement value $\omega$, to the multiplier 72.

The gain output from the gain unit 70 is a variable gain that is changed continuously based on the generator rotational-speed measurement value $\omega$, is set to a first gain when the generator rotational-speed measurement value $\omega$ is equal to or lower than the minimum set value, and is set to a second gain when the generator rotational-speed measurement value $\omega$ is equal to or higher than the maximum set value. Specifically, the amount of change in the electrical power is decreased by setting the first gain and the second gain small. Thus, it is possible to prevent the rotational speed of the rotor 18 from becoming too low and the generated output power from becoming too high.

On the other hand, when the generator rotational-speed measurement value $\omega$ falls within the range from the minimum set value to the maximum set value, the gain is set so as to be increased continuously to a third gain that is higher than the first gain and the second gain, as the generator rotational-speed measurement value $\omega$ is increased, and the gain is set so as to be reduced to the second gain after reaching the third gain.

Figure 7A:
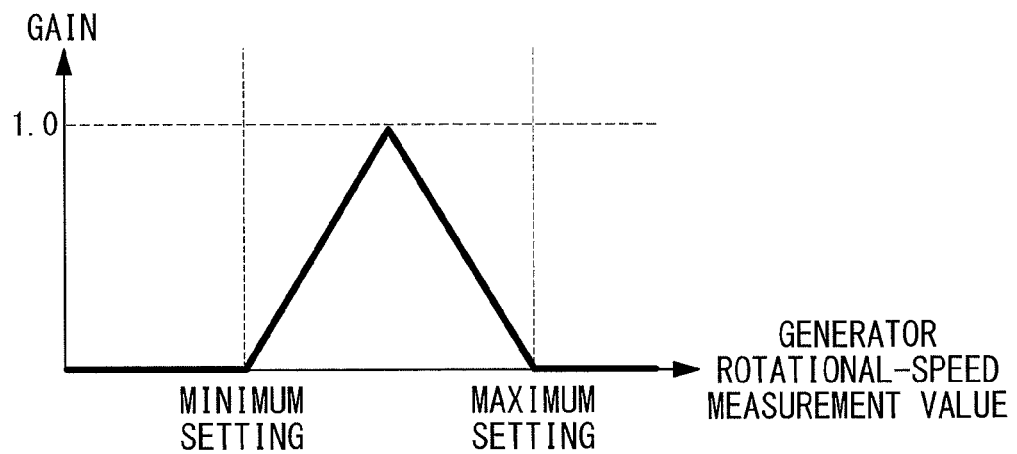
FIG. 7A is a schematic diagram showing an example variable gain according to the second embodiment of the present invention, showing a case where the gain is changed in a triangular manner.
Figure 7B:
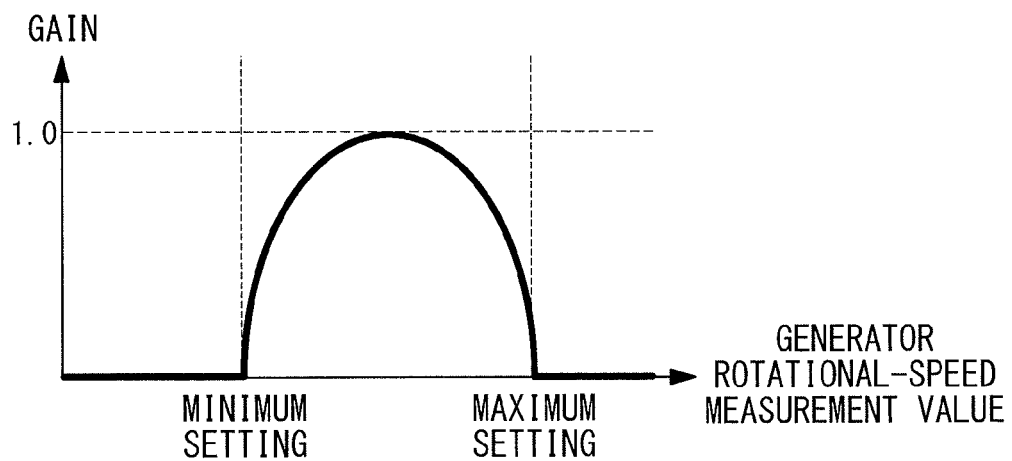
FIG. 7B is a schematic diagram showing an example variable gain according to the second embodiment of the present invention, showing a case where the gain is changed in an arc-shaped manner.

FIGS. 7A and 7B are schematic diagrams showing example variable gains of the second embodiment. FIG. 7A shows a case where the gain is changed in a triangular manner, and FIG. 7B shows a case where the gain is changed in an arc-shaped manner. Note that, in the examples shown in FIGS. 7A and 7B, the first gain and the second gain are set to 0, and the third gain is set to 1.0. The values of the first gain, the second gain, and the third gain are not limited thereto and may be other values, and the first gain and the second gain may have different values. Furthermore, the way the gain is changed is not limited to the triangular manner or the arc-shaped manner, and, for example, the gain may be changed not continuously but discontinuously in a stepwise manner according to the generator rotational-speed measurement value.

The multiplier 72 receives the amount of change in the electrical power output from the adjustment unit 64 and the gain output from the gain unit 70, multiplies the amount of change in the electrical power by the gain, and outputs the multiplication result to the electrical-power-command-value generating section 50 as the PFR demand level $P_d$.

Note that, in the case where the frequency of the utility grid 38 is reduced (the frequency set value f* is larger than the frequency measurement value f), the amount of change in the electrical power output from the adjustment unit 64 has a positive value, and the PFR demand level $P_d$ output from the multiplier 72 is changed within the range from 0 to a positive value; therefore, the wind turbine generator 10 supplies more electrical power to the utility grid 38.

On the other hand, in the case where the frequency of the utility grid 38 is increased (the frequency set value f* is lower than the frequency measurement value f), the amount of change in the electrical power output from the adjustment unit 64 has a negative value, and the PFR demand level $P_d$ output from the multiplier 72 is changed within the range from a negative value to 0; therefore, the wind turbine generator 10 reduces the electrical power to be supplied to the utility grid 38.

As described above, the wind-turbine control device 32 of the second embodiment changes the gain according to the generator rotational-speed measurement value and multiplies the amount of change in the electrical power by the gain; therefore, it is possible to more reliably prevent a situation in which, when a change in the frequency of the utility grid 38 is to be recovered from, an increase or decrease in the generated output power becomes excessive, thus making the wind turbine generator 10 unable to supply electrical power to the utility grid.

Third Embodiment

A third embodiment of the present invention will be described below.

Note that the configurations of the wind turbine generator 10, the wind farm 30, and the electrical-power-command-value generating section 50 of the third embodiment are the same as those of the wind turbine generator 10, the wind farm 30, and the electrical-power-command-value generating section 50 of the first embodiment, shown in FIGS. 1, 2, and 3; therefore, a description thereof will be omitted.

The PFR-demand-level generating section 60 of the third embodiment corrects the amount of change in the electrical power according to the acceleration of rotation of the generator 46. For example, when the generator 46 significantly decelerates (in order to prevent a reduction in the rotational speed), the amount of change in the electrical power is corrected to reduce the PFR demand level. When the generator 46 significantly accelerates, the amount of change in the electrical power is corrected to increase the PFR demand level.

Figure 8A:
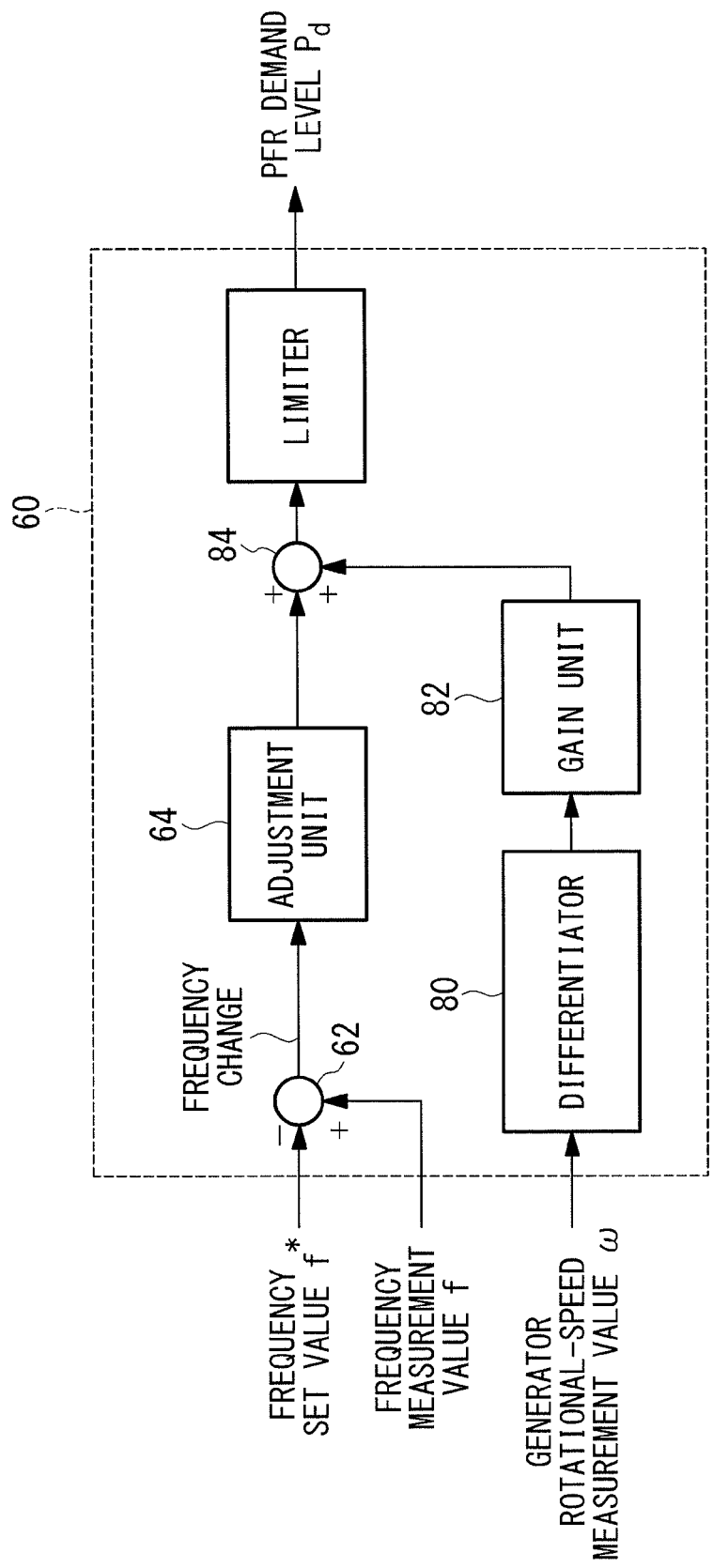
FIG. 8A is a block diagram showing the configuration of an electrical-power-command-value generating section according to a third embodiment of the present invention, showing a case where the amount of change in electrical power is corrected by adding a gain corresponding to a generator rotational-speed measurement value to the amount of change in the electrical power.
Figure 8B:
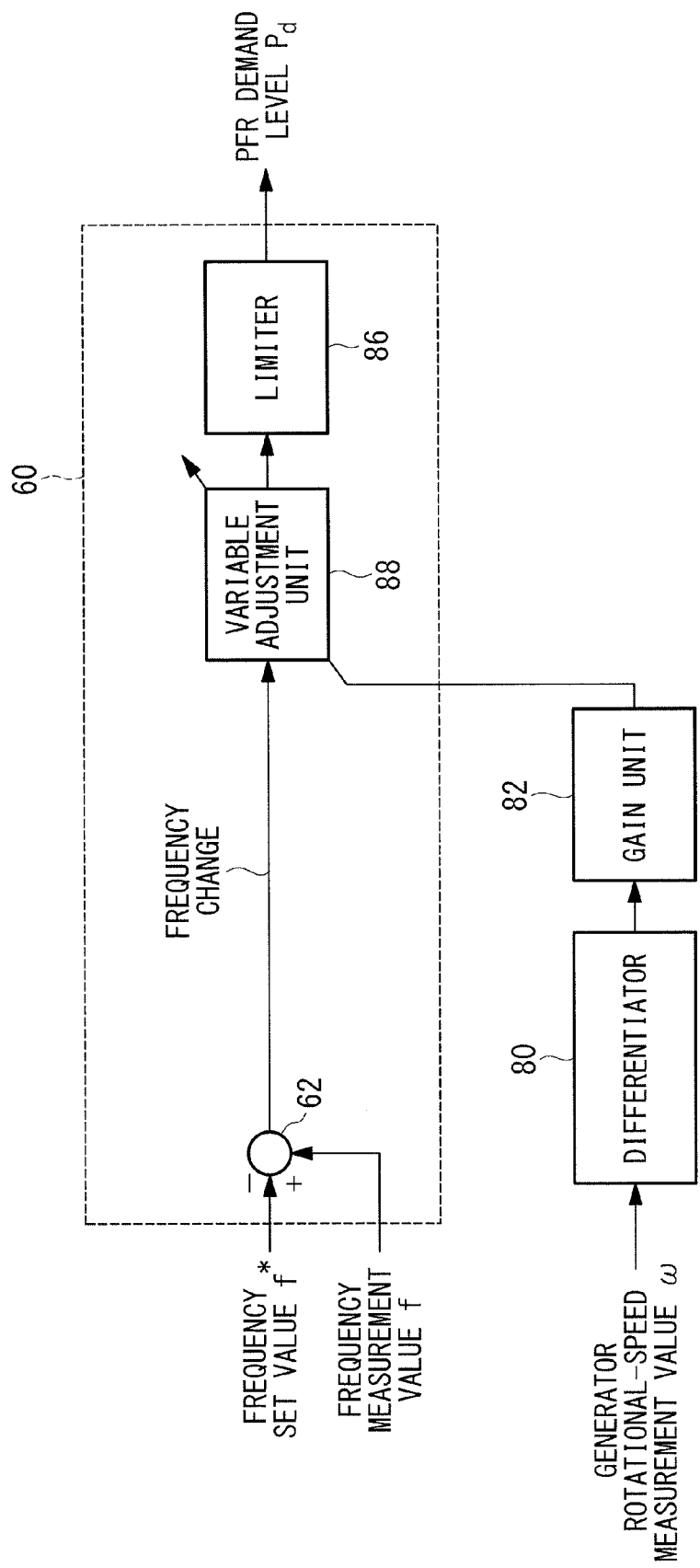
FIG. 8B is a block diagram showing the configuration of the electrical-power-command-value generating section according to the third embodiment of the present invention, showing a case where the amount of change in the electrical power is corrected by making an adjustment rate variable.

FIGS. 8A and 8B show the configurations of the PFR-demand-level generating section 60 of the third embodiment. Note that the same reference symbols as those in FIG. 4 are assigned to the same constituent parts shown in FIGS. 8A and 8B as those shown in FIG. 4, and a description thereof will be omitted.

The configuration of the PFR-demand-level generating section 60 shown in FIG. 8A is used in a case where the amount of change in the electrical power is corrected by adding a gain corresponding to the generator rotational-speed measurement value to the amount of change in the electrical power.

The PFR-demand-level generating section 60 shown in FIG. 8A includes a differentiator 80, a gain unit 82, an adder 84, and a limiter 86.

The differentiator 80 receives the generator rotational-speed measurement value ω, differentiates the generator rotational-speed measurement value ω to calculate the acceleration of rotation of the generator 46, and outputs the acceleration to the gain unit 82.

Note that the PFR-demand-level generating section 60 of the third embodiment may use, instead of the differentiator 80, a filter that has a similar approximative property (property of producing a high gain in the high-frequency band so as to emphasize a rapid change in the rotation of the generator 46) to the function of the differentiator 80, in order to be unaffected by noise.

The gain unit 82 outputs a gain corresponding to the acceleration, to the adder 84.

The adder 84 receives the amount of change in the electrical power output from the adjustment unit 64 and the gain output from the gain unit 82, adds the gain to the amount of change in the electrical power, and outputs the result to the limiter 86.

A lower limit and an upper limit are set in the limiter 86, and the limiter 86 outputs a PFR demand level $P_d$ obtained by limiting the result output from the adder 84 so as to fall within the range from the lower limit to the upper limit. Note that PFR-demand-level generating section 60 of the third embodiment may use the limiter 66 of the PFR-demand-level generating section 60 of the first embodiment, instead of the limiter 86.

The configuration of the PFR-demand-level generating section 60 shown in FIG. 8B is used in a case where the amount of change in the electrical power is corrected by making the adjustment rate variable.

The PFR-demand-level generating section 60 shown in FIG. 8B includes a variable adjustment unit 88.

The variable adjustment unit 88 receives the frequency change output from the subtracter 62 and the gain output from the gain unit 82. Then, the variable adjustment unit 88 changes the adjustment rate according to the received gain, calculates the voltage change by multiplying the frequency change by the changed adjustment rate, and outputs the voltage change to the limiter 86.

Note that, when the received gain (the differential value of the rotational speed of the generator 46) is large, the variable adjustment unit 88 reduces the adjustment rate to avoid a situation in which the rotational speed of the rotor 18 is significantly changed (drops) because the inertial force is used too much. When the received gain is small, because it is considered that the rotational speed of the rotor 18 does not drop to a level where the wind turbine generator 10 is disconnected even though more inertial force is used, the variable adjustment unit 88 increases the adjustment rate to supply more electrical power from the wind turbine generator 10 to the utility grid 38.

As described above, the wind-turbine control device 32 of the third embodiment corrects the amount of change in the electrical power according to the acceleration of rotation of the generator 46; therefore, it is possible to more reliably prevent a situation in which, when a change in the frequency of the utility grid 38 is to be recovered from, an increase or decrease in the generated output power becomes excessive, thus making the wind turbine generator 10 unable to supply electrical power to the utility grid.

Fourth Embodiment

A fourth embodiment of the present invention will be described below.

Note that the configurations of the wind turbine generator 10, the wind farm 30, and the electrical-power-command-value generating section 50 of the fourth embodiment are the same as those of the wind turbine generator 10, the wind farm 30, and the electrical-power-command-value generating section 50 of the first embodiment, shown in FIGS. 1, 2, and 3; therefore, a description thereof will be omitted.

The PFR-demand-level generating section 60 of the fourth embodiment predicts the frequency of the generated output power of the wind turbine generator 10 and a change in wind speed and corrects the amount of change in the electrical power according to the prediction results. For example, when the frequency of the generated output power of the generator 46 and the wind speed are reduced (in order to prevent a reduction in the rotational speed of the rotor), the amount of change in the electrical power is corrected to reduce the PFR demand level. When the frequency of the generated output power of the generator 46 and the wind speed are increased, the amount of change in the electrical power is corrected to increase the PFR demand level.

Figure 9A:
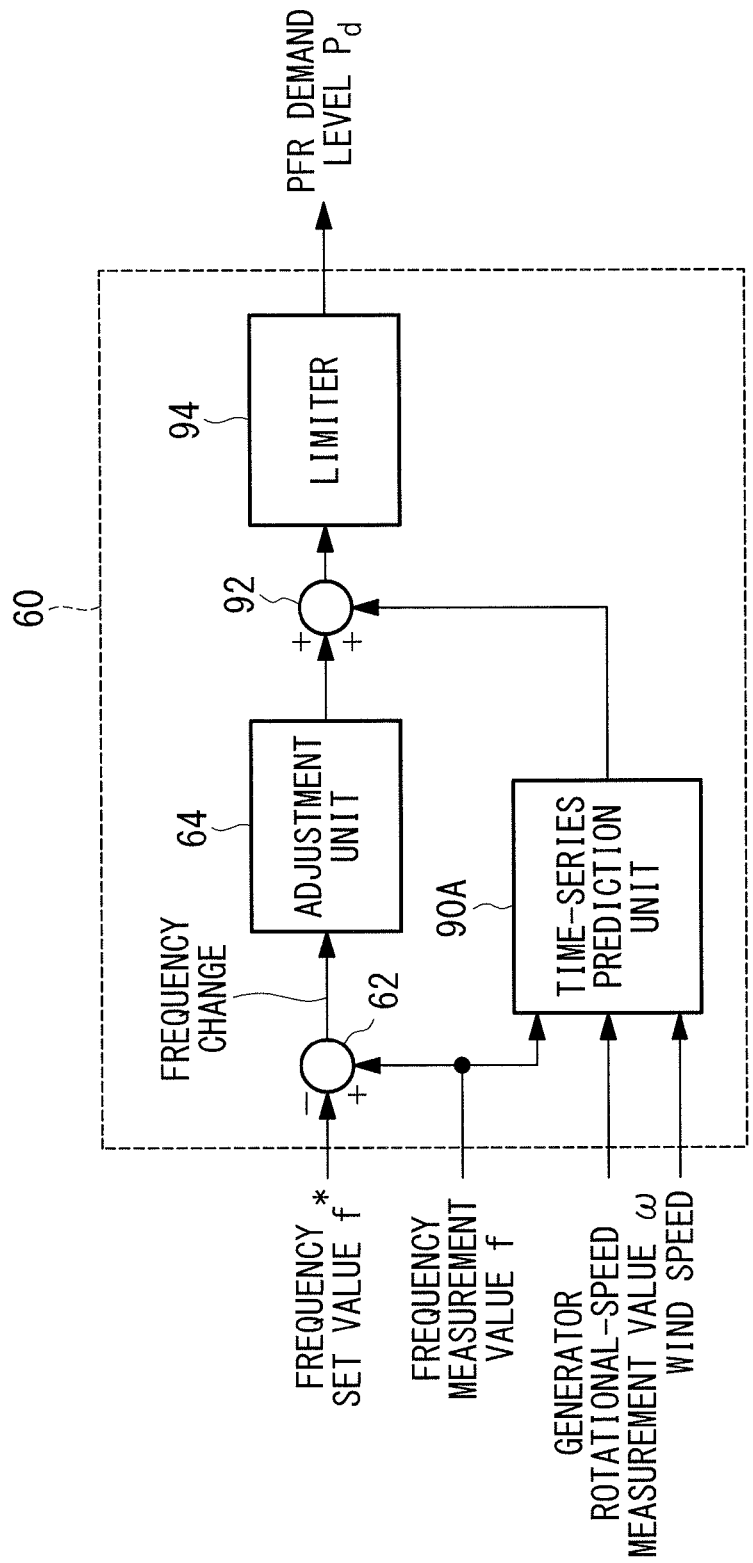
FIG. 9A is a block diagram showing the configuration of an electrical-power-command-value generating section according to a fourth embodiment of the present invention, showing a case where the amount of change in electrical power is corrected by adding a value corresponding to the frequency of the generated output power and the wind speed to the amount of change in the electrical power.
Figure 9B:
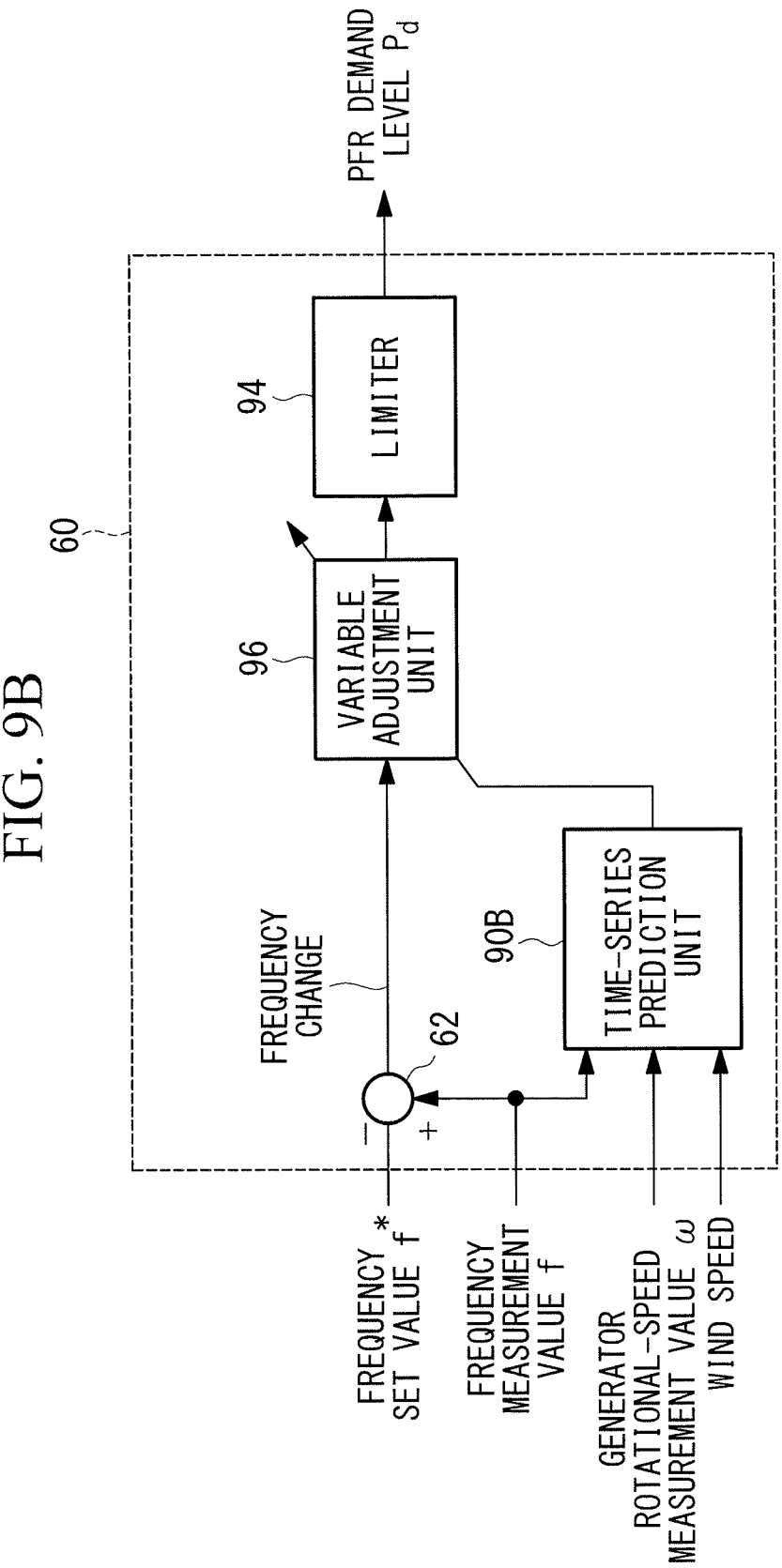
FIG. 9B is a block diagram showing the configuration of the electrical-power-command-value generating section according to the fourth embodiment of the present invention, showing a case where the amount of change in the electrical power is corrected by making an adjustment rate variable.
Figure 10:
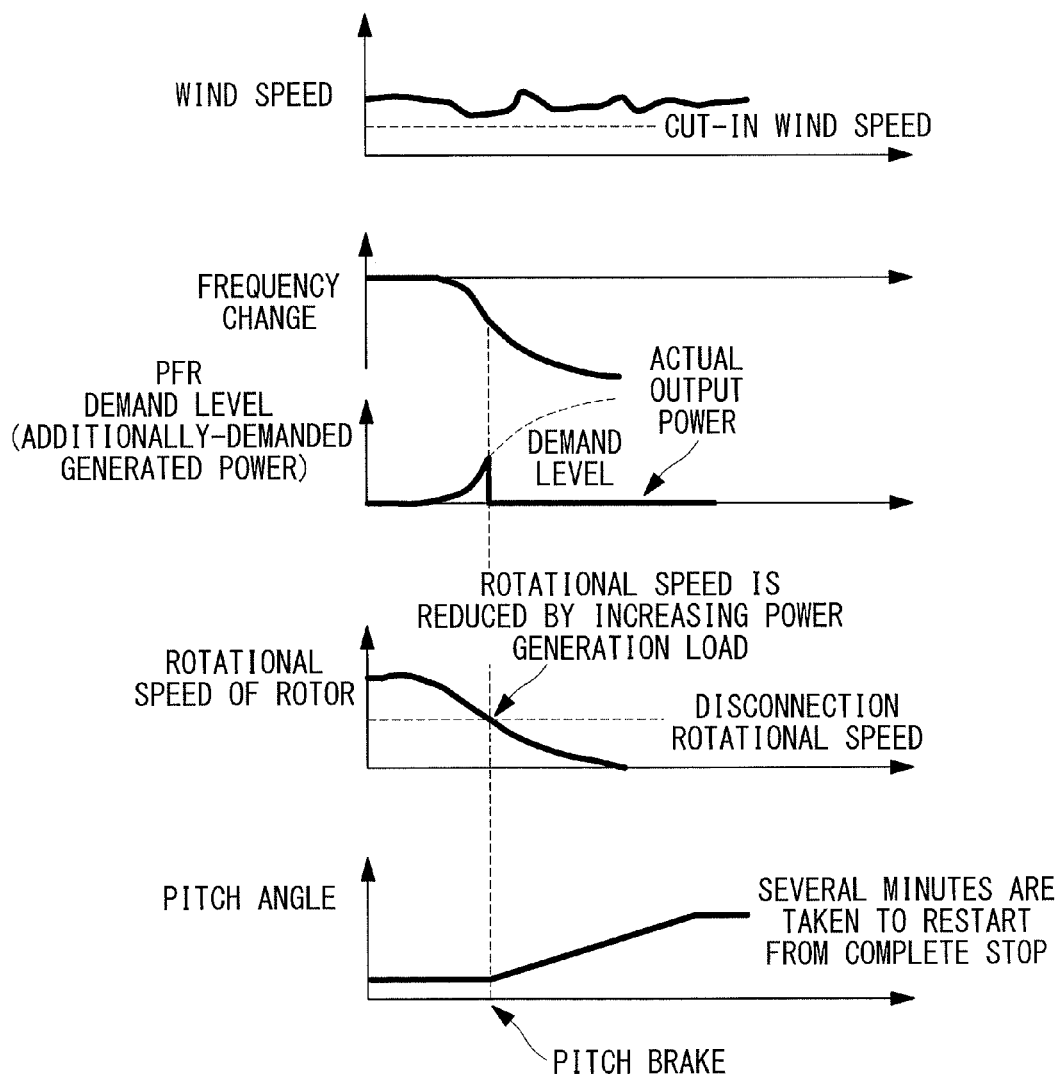
FIG. 10 is a diagram for explaining conventional frequency response control.

FIGS. 9A and 9B show the configurations of the PFR-demand-level generating section 60 of the fourth embodiment. Note that the same reference symbols as those in FIG. 4 are assigned to the same constituent parts shown in FIGS. 9A and 9B as those shown in FIG. 4, and a description thereof will be omitted.

The configuration of the PFR-demand-level generating section 60 shown in FIG. 9A is used in a case where the amount of change in the electrical power is corrected by adding a value corresponding to the frequency of the generated output power, the wind speed and the rotational-speed of the generator, to the amount of change in the electrical power.

The PFR-demand-level generating section 60 shown in FIG. 9A includes a time-series prediction unit 90A, an adder 92, and a limiter 94.

The time-series prediction unit 90A predicts the frequency of the generated output power of the wind turbine generator 10 and the amount of change in wind speed with respect to the wind turbine generator 10 by a time-series prediction algorithm using a statistical method, such as an autoregressive model, based on the generator rotational-speed measurement value ω, the frequency measurement value f, and the wind speed with respect to the wind turbine generator 10, obtains a corrective output power from the prediction results, and outputs the corrective output power to the adder 92.

The adder 92 receives the amount of change in the electrical power output from the adjustment unit 64 and the corrective output power output from the time-series prediction unit 90A, adds a corrective value to the amount of change in the electrical power, and outputs the result to the limiter 94.

A lower limit and an upper limit are set in the limiter 94, and the limiter 94 outputs a PFR demand level $P_d$ obtained by limiting the result output from the adder 92 so as to fall within the range from the lower limit to the upper limit. Note that the PFR-demand-level generating section 60 of the fourth embodiment may use the limiter 66 of the PFR-demand-level generating section 60 of the first embodiment, instead of the limiter 94.

The configuration of the PFR-demand-level generating section 60 shown in FIG. 9B is used in a case where the amount of change in the electrical power is corrected by making the adjustment rate variable.

The PFR-demand-level generating section 60 shown in FIG. 9B includes a time-series prediction unit 90B and a variable adjustment unit 64B.

The time-series prediction unit 90B predicts the frequency of the generated output power of the wind turbine generator 10 and the amount of change in wind speed with respect to the wind turbine generator 10 by a time-series prediction algorithm using a statistical method, such as an autoregressive model, based on the generator rotational-speed measurement value ω, the frequency measurement value f, and the wind speed with respect to the wind turbine generator 10, obtains a correction coefficient from the prediction results, and outputs the correction coefficient to a variable adjustment unit 96.

The variable adjustment unit 64B receives the frequency change output from the subtracter 62 and the correction coefficient output from the time-series prediction unit 90B. Then, the variable adjustment unit 64B changes the adjustment rate by multiplying the adjustment rate by the received correction coefficient, calculates the voltage change by further multiplying the frequency change by the changed adjustment rate, and outputs the voltage change to the limiter 94.

As described above, the wind-turbine control device 32 of the fourth embodiment predicts the frequency measured at the end of the wind turbine generator 10, a change in wind speed and a change in the rotational-speed of the generator (the acceleration) and corrects the amount of change in the electrical power according to the prediction results; corrects the amount of change in the electrical power according to the acceleration of rotation of the generator 46; therefore, it is possible to more reliably prevent a situation in which, when a change in the frequency of the utility grid 38 is to be recovered from, an increase or decrease in the generated output power becomes excessive, thus making the wind turbine generator 10 unable to supply electrical power to the utility grid.

Furthermore, the values input to the time-series prediction units 90A and 90B are not limited to the frequency measurement value f, the generator rotational-speed measurement value ω, and the wind speed, and other values may be input and used for the time-series prediction algorithm.

Although the present invention has been described above by using the above-described embodiments, the technical scope of the present invention is not limited to the scope described in the embodiments. Various modifications and improvements can be added to the embodiments without departing from the scope of the invention, and embodiments in which such modifications or improvements are added are also encompassed in the technical scope of the present invention.

For example, in the above-described embodiments, a description has been given of a case in which the wind farm 30 includes a plurality of wind turbine generators 10; however, the present invention is not limited thereto, and the wind farm 30 may include a single wind turbine generator 10.

REFERENCE SIGNS LIST 10 wind turbine generator
18 rotor
20 blades
30 wind farm
32 wind-turbine control device
38 utility grid
46 generator
62 subtracter
66 limiter
70 gain unit
80 differentiator
82 gain unit
90A time-series prediction unit
90B time-series prediction unit

The invention claimed is:

1. A wind-turbine-generator control apparatus for a wind-turbine generator in which a rotor having a plurality of blades receives wind and rotates, a generator generates electrical power through the rotation of the rotor, the electrical power is supplied to a utility grid, and electric energy to be supplied to the utility grid can be changed according to a change in a frequency of the utility grid, the wind-turbine-generator control apparatus comprising:

a calculation unit to which a set value of the frequency for recovering from the change is input when the change in the frequency occurs in the utility grid, and that is configured to calculate a frequency change, which is a difference between a measurement value of the frequency of generated output power of the wind turbine generator and the set value of the frequency; and a limiter configured to limit a change in the electrical power corresponding to the frequency change calculated by the calculation unit, based on the rotational speed of the generator, wherein the limiter sets the change in the electrical power to a preset first limit value when the rotational speed of the generator is equal to or lower than a first set value; sets the change in the electrical power to a preset second limit value that is higher than the first limit value when the rotational speed of the generator is equal to or higher than a second set value; and increases a limit value for the change in the electrical power within a range from the first limit value to the second limit value, as the rotational speed of the generator is increased, when the rotational speed of the generator exceeds the first set value and is lower than the second set value.

2. A wind-turbine-generator control apparatus according to claim 1, wherein the limiter corrects the change in the electrical power based on the acceleration of the rotation of the generator.

3. A wind turbine generator system comprising:

a wind turbine generator in which a rotor having a plurality of blades receives wind and rotates, a generator generates electrical power through the rotation of the rotor, the electrical power is supplied to a utility grid, and electric energy to be supplied to the utility grid can be changed according to a change in the frequency of the utility grid; and a wind-turbine-generator control apparatus that controls the wind turbine generator, according to claim 1.

4. A wind-turbine-generator control apparatus for a wind-turbine generator in which a rotor having a plurality of blades receives wind and rotates, a generator generates electrical power through the rotation of the rotor, the electrical power is supplied to a utility grid, and electric energy to be supplied to the utility grid can be changed according to a change in a frequency of the utility grid, the wind-turbine-generator control apparatus comprising:

a calculation unit to which a set value of the frequency for recovering from the change is input when the change in the frequency occurs in the utility grid, and that is configured to calculate a frequency change, which is a difference between a measurement value of the frequency of generated output power of the wind turbine generator and the set value of the frequency; and a limiter which is configured to limit a change in the electrical power corresponding to the frequency change calculated by the calculation unit, based on the rotational speed of the generator, wherein the limiter multiplies the change in the electrical power by a given gain; and the given gain is set to a first gain when the rotational speed of the generator is equal to or lower than a first set value; is set to a second gain when the rotational speed of the generator is equal to or higher than a second set value; is increased to a third gain that is higher than the first gain and the second gain, as the rotational speed of the generator is increased, when the rotational speed of the generator exceeds the first set value; and, after reaching the third gain, is reduced to the second gain until the rotational speed of the generator reaches the second set value.

5. A wind-turbine-generator control apparatus according to claim 4, wherein the limiter corrects the change in the electrical power based on the acceleration of the rotation of the generator.

6. A wind turbine generator system comprising:
a wind turbine generator in which a rotor having a plurality of blades receives wind and rotates, a generator generates electrical power through the rotation of the rotor, the electrical power is supplied to a utility grid, and electric energy to be supplied to the utility grid can be changed according to a change in the frequency of the utility grid; and
a wind-turbine-generator control apparatus configured to control the wind turbine generator according to claim 4.

7. A wind-turbine-generator control apparatus for a wind-turbine generator in which a rotor having a plurality of blades receives wind and rotates, a generator generates electrical power through the rotation of the rotor, the electrical power is supplied to a utility grid, and electric energy to be supplied to the utility grid can be changed according to a change in a frequency of the utility grid, the wind-turbine-generator control apparatus comprising:
a calculation unit to which a set value of the frequency for recovering from the change is input when the change in the frequency occurs in the utility grid, and that is configured to calculate a frequency change, which is a difference between a measurement value of the frequency of generated output power of the wind turbine generator and the set value of the frequency; and
a limiter which is configured to limit a change in the electrical power corresponding to the frequency change calculated by the calculation unit, based on the rotational speed of the generator, wherein the limiter predicts the frequency of the generated output power of the wind turbine generator and a change in wind speed with respect to the wind turbine generator based on the rotational speed of the generator, the measurement value of the frequency, and the wind speed with respect to the wind turbine generator, and corrects the change in the electrical power based on the prediction results.

8. A wind turbine generator system comprising:
a wind turbine generator in which a rotor having a plurality of blades receives wind and rotates, a generator generates electrical power through the rotation of the rotor, the electrical power is supplied to a utility grid, and electric energy to be supplied to the utility grid can be changed according to a change in the frequency of the utility grid; and
a wind-turbine-generator control apparatus configured to control the wind turbine generator according to claim 7.

9. A wind-turbine-generator control method for a wind-turbine generator in which a rotor having a plurality of blades receives wind and rotates, a generator generates electrical power through the rotation of the rotor, the electrical power is supplied to a utility grid, and electric energy to be supplied to the utility grid can be changed according to a change in a frequency of the utility grid, the method comprising:
inputting a set value of the frequency for recovering from the change when the change in the frequency occurs in the utility grid, and calculating a frequency change, which is a difference between a measurement value of the frequency of generated output power of the wind turbine generator and the set value of the frequency; and
limiting a change in the electrical power corresponding to the calculated frequency change, based on the rotational speed of the generator, wherein
the change in the electrical power is set to a preset first limit value when the rotational speed of the generator is equal to or lower than a first set value,
the change in the electrical power is set to a preset second limit value that is higher than the first limit value when the rotational speed of the generator is equal to or higher than a second set value, and
a limit value for the change in the electrical power is increased within a range from the first limit value to the second limit value, as the rotational speed of the generator is increased, when the rotational speed of the generator exceeds the first set value and is lower than the second set value.

10. A wind-turbine-generator control method for a wind-turbine generator in which a rotor having a plurality of blades receives wind and rotates, a generator generates electrical power through the rotation of the rotor, the electrical power is supplied to a utility grid, and electric energy to be supplied to the utility grid can be changed according to a change in a frequency of the utility grid, the method comprising:
inputting a set value of the frequency for recovering from the change when the change in the frequency occurs in the utility grid, and calculating a frequency change, which is a difference between a measurement value of the frequency of generated output power of the wind turbine generator and the set value of the frequency; and
limiting a change in the electrical power corresponding to the calculated frequency change, based on the rotational speed of the generator, wherein
the change in the electrical power is multiplied by a given gain, and the given gain is set to a first gain when the rotational speed of the generator is equal to or lower than a first set value,
the given gain is set to a second gain when the rotational speed of the generator is equal to or higher than a second set value,
the given gain is increased to a third gain that is higher than the first gain and the second gain, as the rotational speed of the generator is increased, when the rotational speed of the generator exceeds the first set value, and
after reaching the third gain, the given gain is reduced to the second gain until the rotational speed of the generator reaches the second set value.

11. A wind-turbine-generator control method for a wind-turbine generator in which a rotor having a plurality of blades receives wind and rotates, a generator generates electrical power through the rotation of the rotor, the electrical power is supplied to a utility grid, and electric energy to be supplied to the utility grid can be changed according to a change in frequency of the utility grid, the method comprising:
inputting a set value of the frequency for recovering from the change when the change in the frequency occurs in the utility grid, and calculating a frequency change, which is a difference between a measurement value of the frequency of generated output power of the wind turbine generator and the set value of the frequency; and limiting a change in the electrical power corresponding to the calculated frequency change, based on the rotational speed of the generator, wherein the frequency of the generated output power of the wind turbine generator and a change in wind speed with respect to the wind turbine generator is predicted based on the rotational speed of the generator, the measurement value of the frequency, and the wind speed with respect to the wind turbine generator, and the change in the electrical power is corrected based on the prediction results.

\* \* \* \* \*